United States Patent
Lee et al.

(10) Patent No.: US 8,808,599 B2
(45) Date of Patent: Aug. 19, 2014

(54) METHOD OF MANUFACTURING DAMPER ASSEMBLY OF REFRIGERATOR

(75) Inventors: Jaeyoul Lee, Gyeongnam (KR); Ilyoong Park, Gyeongnam (KR); Changbong Choi, Geyongnam (KR); Miryoung Kang, Gyeongnam (KR); Manho Park, Gyeongnam (KR)

(73) Assignee: LG Electronics Inc., Seoul (KR)

( * ) Notice: Subject to any disclaimer, the term of this patent is extended or adjusted under 35 U.S.C. 154(b) by 354 days.

(21) Appl. No.: 13/189,717

(22) Filed: Jul. 25, 2011

(65) Prior Publication Data

US 2012/0025418 A1    Feb. 2, 2012

(30) Foreign Application Priority Data

Jul. 30, 2010 (KR) .................. 10-2010-0073774

(51) Int. Cl.
  *B29C 45/14* (2006.01)
  *B29C 45/16* (2006.01)

(52) U.S. Cl.
  USPC ........... 264/248; 264/255; 264/267; 264/268; 264/275

(58) Field of Classification Search
  None
  See application file for complete search history.

(56) References Cited

U.S. PATENT DOCUMENTS

| | | | | |
|---|---|---|---|---|
| 3,420,729 A | * | 1/1969 | Roberts | 428/35.7 |
| 4,209,999 A | * | 7/1980 | Falk et al. | 62/344 |
| 5,074,770 A | * | 12/1991 | Graefe | 425/117 |
| 5,284,608 A | * | 2/1994 | Vismara | 264/37.3 |
| 5,618,477 A | * | 4/1997 | Suzuki | 264/46.5 |
| 6,150,026 A | * | 11/2000 | Furuya et al. | 428/424.8 |
| 7,222,498 B2 | | 5/2007 | Lee | |
| 2005/0196600 A1 | | 9/2005 | Lee | |
| 2006/0179869 A1 | | 8/2006 | Lee | |
| 2008/0026202 A1 | | 1/2008 | Lee | |
| 2011/0113812 A1 | | 5/2011 | Lee | |
| 2011/0113813 A1 | | 5/2011 | Lee | |

FOREIGN PATENT DOCUMENTS

| | | |
|---|---|---|
| CN | 2091283 U | 12/1991 |
| CN | 1598451 A | 3/2005 |
| CN | 1663769 A | 9/2005 |
| EP | 1 574 312 A2 | 9/2005 |

OTHER PUBLICATIONS

Chinese Office Action and Search Report dated Nov. 22, 2013 for Application No. 201110264870.6, with English Translation, 14 pages.

* cited by examiner

*Primary Examiner* — Edmund H. Lee
(74) *Attorney, Agent, or Firm* — Fish & Richardson P.C.

(57) ABSTRACT

Provided is a method of manufacturing a damper assembly. In the method, a case constituting an appearance of the damper assembly and having an open surface is molded, the case is inserted in a jig, the case is filled with a thermal insulating material to blow and mold the thermal insulating material, and a closing plate is coupled to the case to cover the open surface of the case. The closing plate contacts the discharge duct when the damper assembly closes the discharge duct. Accordingly, dimension stability, a defect rate, and sealing and insulating performances of the damper assembly are improved.

12 Claims, 7 Drawing Sheets

METHOD OF MANUFACTURING DAMPER ASSEMBLY OF REFRIGERATOR

CROSS-REFERENCE TO RELATED APPLICATIONS

The present application claims the benefit of priority under 35 U.S.C. 119 to Korean Patent Application No. 10-2010-0073774 (filed on Jul. 30, 2010) which is hereby incorporated by reference in its entirety.

BACKGROUND

The present disclosure relates to a method of manufacturing a damper assembly that constitutes a refrigerator and that opens and closes a water or ice dispensing hole to prevent the leakage of cool air.

Refrigerators are electric appliances for storing foods at low temperature in a storing space closed by a door. The storing space is cooled with cool air that exchanges heat with refrigerant circulating in refrigeration cycles, thereby optimally storing foods.

Along with the change of people's eating patterns and preferences, large and multifunctional refrigerators have been introduced, and various comfortable structures have been added to refrigerators. For example, a refrigerator may include a dispenser for dispensing ice made by an ice maker, without opening a door of the refrigerator.

Such a dispenser is installed on an exterior part of a refrigerator door, and dispenses ice made by an ice maker in a refrigerator, according to a user's operation. The dispenser includes a recess recessed inward from the front surface of the refrigerator door. A container for receiving ice is placed in the recess, and an ice dispensing button or lever is manipulated to dispense the ice.

Ice made by the ice maker is stored in an ice bank, and the ice is dispensed through a discharge duct communicating with the ice bank and the dispenser, when the ice dispensing button or lever is manipulated. A damper assembly is installed on an end of the discharge duct near the dispenser to selectively open the end when the ice dispensing button or lever is manipulated.

Since the damper assembly is connected to the ice bank through the discharge duct, the damper assembly is required to have sealing and insulating performances, thereby preventing ice from being molten in the ice bank and preventing cool air from leaking out of a freezing compartment.

SUMMARY

In one embodiment, a method of manufacturing a damper assembly constituting a refrigerator and configured to open and close a discharge duct for discharging ice from a dispenser of a refrigerator door includes: molding a case constituting an appearance of the damper assembly and having an open surface; inserting the case in a jig and filling the case with a thermal insulating material to blow and mold the thermal insulating material; and coupling a closing plate to the case to cover the open surface of the case, the closing plate contacting the discharge duct when the damper assembly closes the discharge duct.

The thermal insulating material may include polyurethane.

The thermal insulating material may be blown and entirely fill an inside of the case such that the thermal insulating material is flush with the open surface of the case.

The closing plate may include a thermoplastic elastomer (TPE).

The closing plate may include an elastic deformable material.

The coupling of the closing plate may include fixing the molded closing plate to the open surface of the case filled with the blown thermal insulating material.

The closing plate may be fixed using an adhesive fixes to an end of the thermal insulating material and the case.

The closing plate may be press-fit coupled in a fixing recess disposed along a front end of the case.

The coupling of the closing plate may include inserting the case filled with the blown thermal insulating material into a mold to integrally form the closing plate with the case through insert injection molding.

The closing plate may be closely fixed to both a front surface of the thermal insulating material and a front end of the case.

A fixing recess may be recessed in a front end of the case, an insertion part may be disposed on a rear surface of the closing plate to correspond to the fixing recess, and the insertion part may be inserted in the fixing recess.

A sealing part protruding forward may surround the closing plate.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the preferred embodiments of the present disclosure, examples of which are illustrated in the accompanying drawings.

Figure 1:
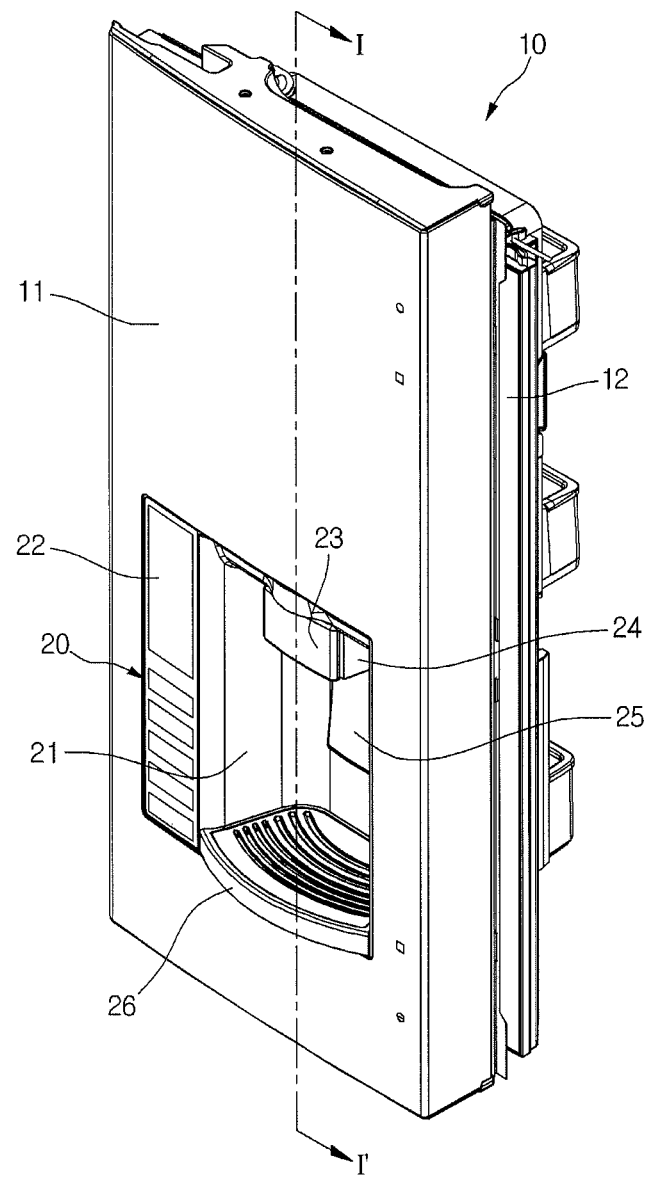
FIG. 1 is a perspective view illustrating a refrigerator door including a dispenser according to an embodiment.

FIG. 1 is a perspective view illustrating a refrigerator door including a dispenser according to an embodiment.

Referring to FIG. 1, a door 10 according to the current embodiment includes: an outer cover 11 constituting an appearance of the door 10; a door liner 12 coupled to the rear portion of the outer cover 11, and a thermal insulating member (not shown) filling a space between the outer cover 11 and the door liner 12.

A recess is recessed a predetermined depth in the front surface of the door 10. A dispenser 20 is disposed in the recess. The dispenser 20 is recessed rearward to form a space receiving a container that contains ice or water. In detail, the dispenser 20 includes a housing 21 disposed in the recess of the door 10. The housing 21 may include a bottom surface, a wall including left, right, and rear surfaces extending upward from the bottom surface, and a top surface connecting top ends of the wall to one another.

The dispenser 20 may include: a tray 26 that is removably coupled to or is drawable from the bottom surface of the housing 21; an ice dispensing button 25 that is installed on the rear surface of the housing 21; an ice chute 24 that extends downward from the top surface of the housing 21; and a water dispensing button 23 disposed in front of the ice chute 24. A water dispensing hole (not shown) is disposed in the top surface of the housing 21, particularly, in the top surface in front of the water dispensing button 23, and is connected to a water supply pipe (not shown) that is inserted in the door 10.

When the ice dispensing button 25 is pressed, ice is dispensed from the ice chute 24. The dispenser 20 is provided with a control panel 22 to manipulate the dispenser 20 and check an operation of the dispenser 20. Dispensing of ice from a freezing compartment by the dispenser 20 will be described later.

Figure 2:
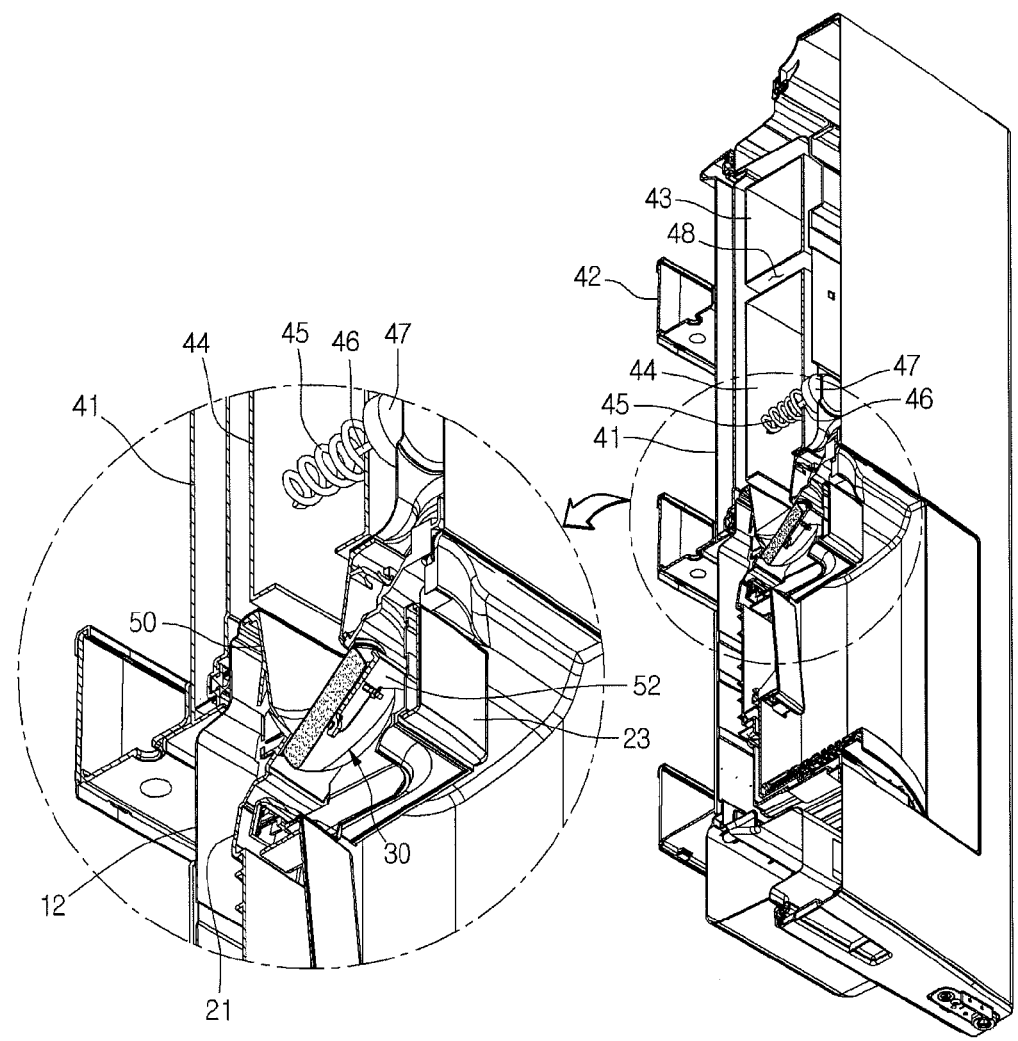
FIG. 2 is a cut-away perspective view taken along line I-I' of FIG. 1.

FIG. 2 is a cut-away perspective view taken along line I-I' of FIG. 1.

Referring to FIG. 2, the rear portion of the door 10 is provided with an ice making compartment 48. In detail, an ice maker 43 and an ice bank 44 are disposed in the ice making compartment 48. The ice maker 43 makes ice from water supplied to the ice making compartment 48. The ice bank 44 is disposed under the ice maker 43 to store the ice made by the ice maker 43. An ice making assembly includes the ice making compartment 48, the ice maker 43, and the ice bank 44. When the ice dispensing button 25 provided to the dispenser 20 is pressed, ice is discharged through a discharge duct 50 communicating with the ice bank 44.

A first end of the discharge duct 50 communicates with the ice bank 44, and a second end thereof communicates with the top surface of the housing 21 and is exposed to the outside. Ice in the ice bank 44 may be molten by external air introduced to the ice bank 44 through the second end of the discharge duct 50 or by heat transfer due to a temperature difference between the inside and outside of the discharge duct 50. A damper assembly 30 closes the second end of the discharge duct 50 to prevent the ice from being molten. The damper assembly 30 opens and closes the second end of the discharge duct 50 to selectively discharge ice from the ice bank 44.

The ice bank 44 is provided with a mechanism for transferring and/or crushing ice. The mechanism includes an auger 45 pressing ice from the ice bank 44 to the discharge duct 50, and a motor 47 driving the auger 45. The motor 47 rotates the auger 45 to supply ice to the discharge duct 50.

The damper assembly 30 selectively opening and closing the second end of the discharge duct 50, and a method of manufacturing the damper assembly 30 will now be described with reference to the accompanying drawings.

Figure 3:
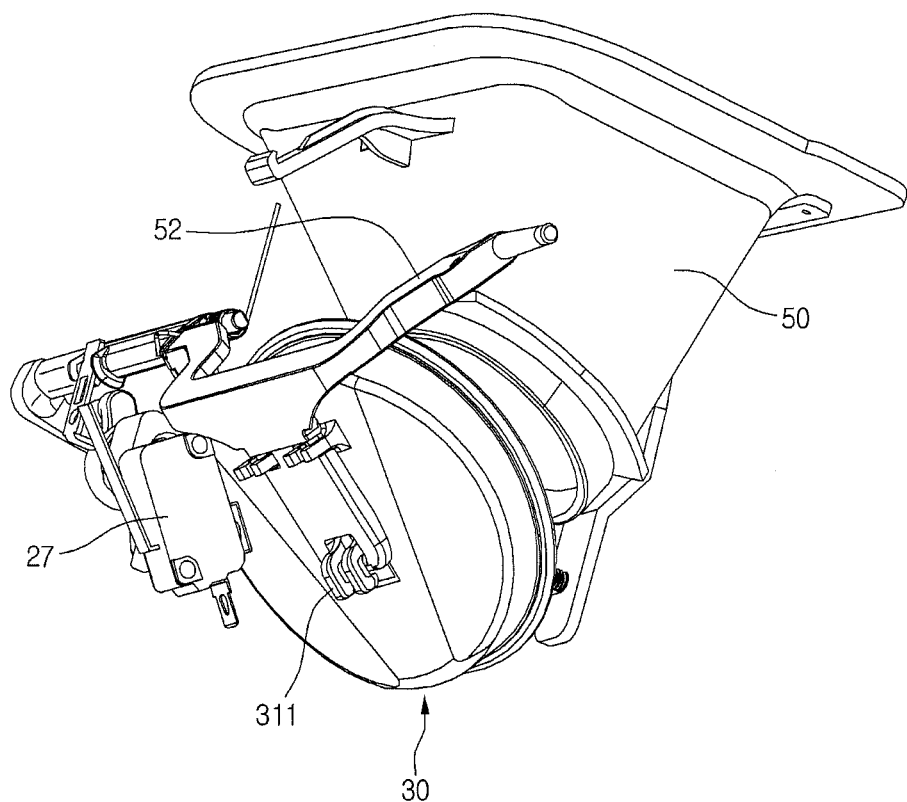
FIG. 3 is a perspective view illustrating a state in which a damper assembly opens an outlet end of a discharge duct according to an embodiment.

FIG. 3 is a perspective view illustrating a state in which a damper assembly opens an outlet end of a discharge duct according to an embodiment.

Referring to FIG. 3, when the ice dispensing button 25 is pressed, the damper assembly 30 closing the second end (also called an outlet end) of the discharge duct 50 may rotate about a rotation shaft 52 connected to the damper assembly 30, to open the outlet end.

Figure 4:
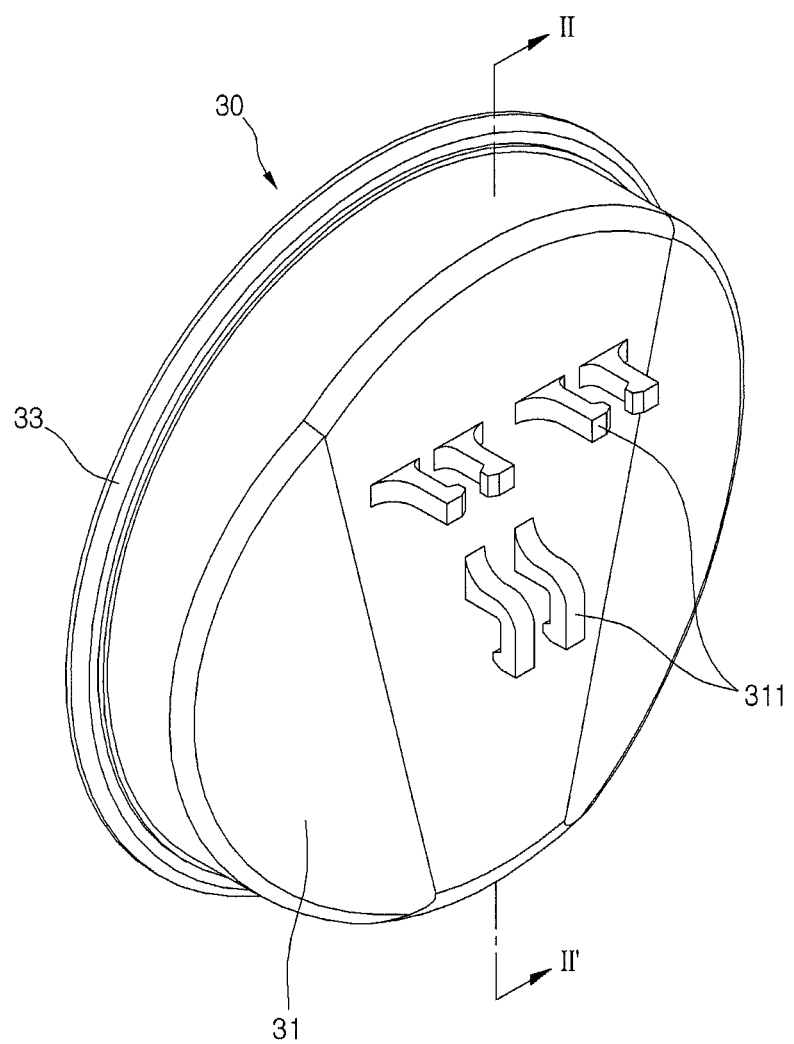
FIG. 4 is a perspective view illustrating a damper assembly according to an embodiment.
Figure 5:
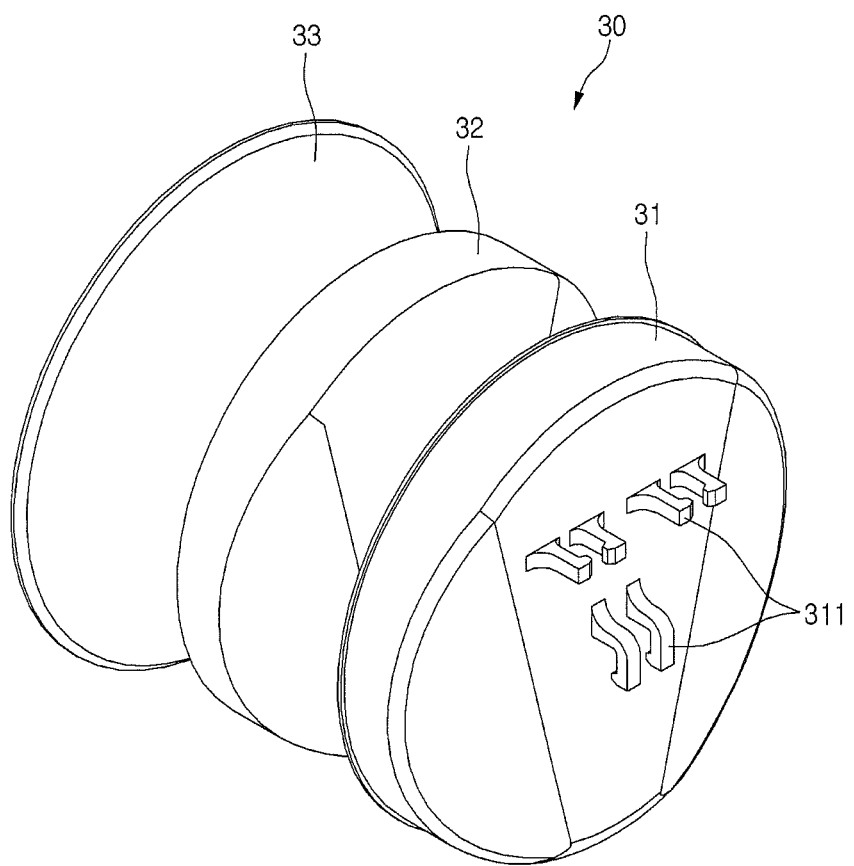
FIG. 5 is an exploded perspective view illustrating the damper assembly of FIG. 4.
Figure 6:
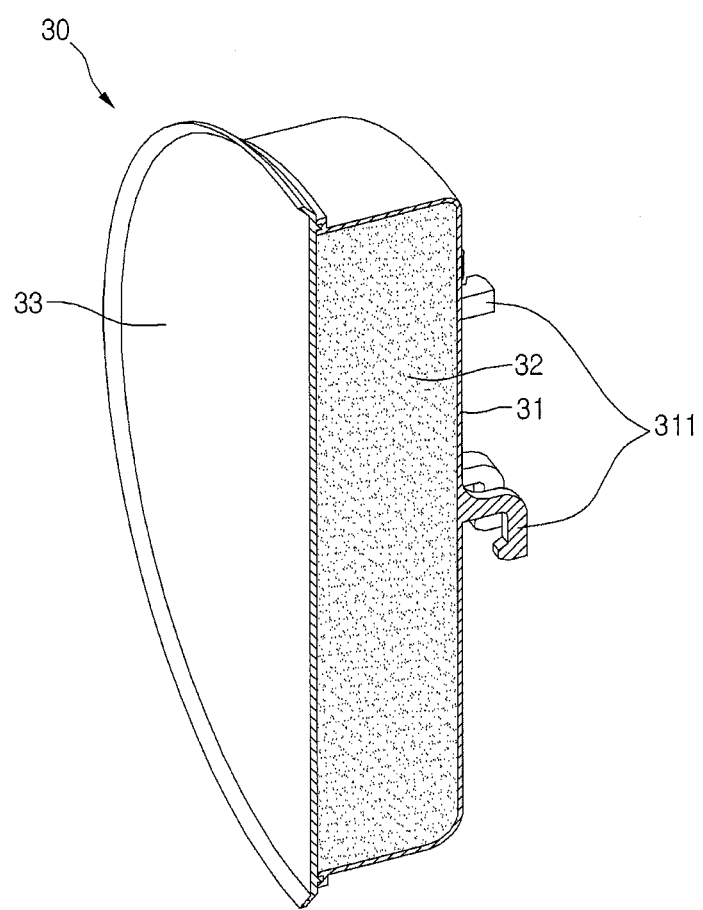
FIG. 6 is a cut-away perspective view taken along line II-II' of FIG. 4.

FIG. 4 is a perspective view illustrating a damper assembly according to an embodiment. FIG. 5 is an exploded perspective view illustrating the damper assembly of FIG. 4. FIG. 6 is a cut-away perspective view taken along line II-II' of FIG. 4.

Referring to FIGS. 4 and 6, the damper assembly 30 includes a closing plate 33, a thermal insulating member 32, and a case 31.

The closing plate 33 closes the outlet end of the discharge duct 50 to prevent ice from being discharged. The closing plate 33 is inserted in the discharge duct 50 such that the outer surface of the closing plate 33 closely contacts the inner surface of the discharge duct 50 to close the discharge duct 50. Accordingly, the inside of the discharge duct 50 can be reliably maintained at low temperature. To this end, the closing plate 33 may be formed of a deformable soft material such as silicone, rubber, or synthetic resin.

Referring to FIG. 4, the closing plate 33 may have a larger area than that of the thermal insulating member 32 or the case 31 to more reliably contact the discharge duct 50. Accordingly, when the discharge duct 50 is closed, cool air is prevented from leaking out of the discharge duct 50. Since the closing plate 33 is formed of a deformable soft material, when the ice dispensing button 25 is manipulated to dispense ice, the closing plate 33 smoothly slides along the inner surface of the discharge duct 50, thereby facilitating opening and closing of the discharge duct 50.

A sealing part 331 surrounds the closing plate 33. The sealing part 331 entirely surrounds the closing plate 33, and is inclined forward (to the left side of FIG. 6). The sealing part 331 may be larger than an opening of the discharge duct 50 to closely contact the discharge duct 50.

The closing plate 33 may include an insertion part 332 on the rear surface thereof. The insertion part 332 may be disposed at a position to correspond to a fixing recess 312 to be described later, and may protrude to be inserted in the fixing recess 312. Accordingly, the closing plate 33 can be fixed to the front end of the case 31. The contact area between the closing plate 33 and the case 31 may be increased to more stably fix the closing plate 33 to the case 31.

A surface of the closing plate 33 is provided with the case 31 that includes support protrusions 311 to receive the rotation shaft 52. The support protrusions 311 are disposed on an exposed surface of the case 31, and thus, can be coupled to the rotation shaft 52 that is rotated according to a user's manipulation. When the ice dispensing button 25 is pressed, driving force is transmitted to the rotation shaft 52 to open and close the discharge duct 50.

The fixing recess 312 is disposed along an open boundary surface of the case 31, that is, along the front end of the case 31. The fixing recess 312 is recessed inward, and has a size to receive the insertion part 332.

The thermal insulating member 32 is disposed between the closing plate 33 and the case 31. The thermal insulating member 32 is formed by filling a foam material the space between the closing plate 33 and the case 31 to prevent heat transfer due to a temperature difference between the inside and outside of the discharge duct 50, thereby maintaining the inside of the discharge duct 50 at low temperature. The thermal insulating member 32 may be formed of a material having low thermal conductivity, such as polyurethane foam.

Figure 7:
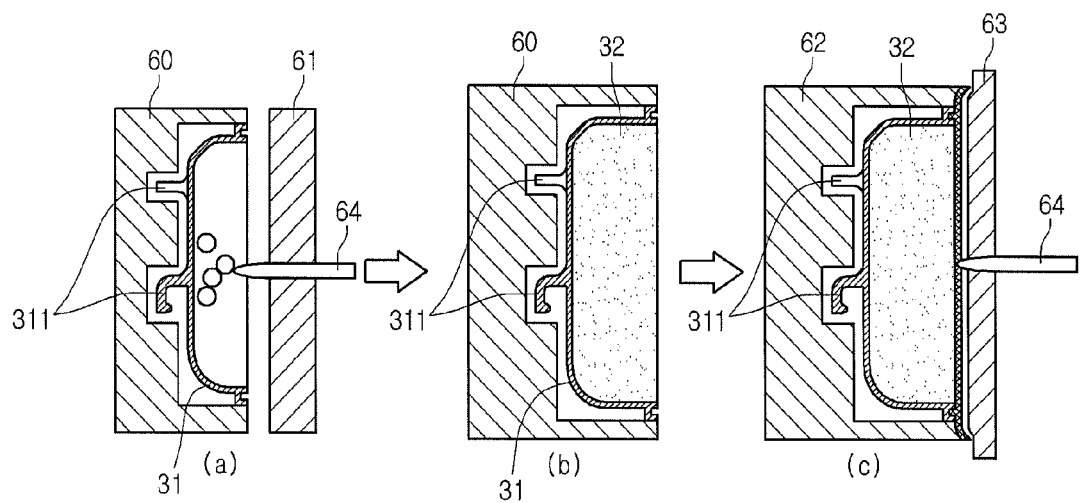
FIGS. 7A to 7C are cross-sectional views illustrating a process of manufacturing the damper assembly of FIG. 4.

FIGS. 7A to 7C are cross-sectional views illustrating a process of manufacturing the damper assembly of FIG. 4.

The case 31 including the support protrusions 311 may be is inserted into a first mold 60, and liquid or gel of an insulating material having low thermal conductivity, such as polyurethane foam, may be injected into the case 31 by an injector 64, and be blown. Accordingly, the case 31 is integrally formed with the thermal insulating member 32.

Then, the closing plate 33, which is separately manufactured, is coupled to a surface of the thermal insulating member 32. To this end, any coupling member such as an adhesive, a rivet, or a bolt may be used. Accordingly, the damper assembly 30 including the case 31, the thermal insulating member 32, and the closing plate 33 is manufactured.

Instead of separately manufacturing the closing plate 33, the closing plate 33 may be integrally formed with the case 31 and the thermal insulating member 32. To this end, the case 31 integrally formed with the thermal insulating member 32 is inserted into a third mold 62, and then, a soft material such as silicone, rubber, or synthetic resin, used to form the closing plate 33 is injected between the third mold 62 and a fourth mold 63. Thus, the closing plate 33 can be integrally formed with the case 31 and the thermal insulating member 32, without separately manufacturing the closing plate 33. A material used to form the closing plate 33 is not limited to the above-described materials.

The following effects can be obtained using the method of manufacturing the damper assembly according to the above embodiments.

Firstly, since the thermal insulating member is blown in the case and is integrally formed with the case, or the thermal insulating member integrally formed with the case is integrally formed with the closing plate, dimension stability thereof can be further improved than that of a method of separately forming a thermal insulating member, a case, and a closing plate, and assembling them.

Secondly, sealing and insulating performances of the damper assembly are improved to increase the efficiency of a refrigerator, thereby saving power consumption.

Thirdly, since the parts constituting the damper assembly are integrally formed, a process of assembling the damper assembly can be simplified.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of manufacturing a damper assembly constituting a refrigerator and configured to open and close a discharge duct for discharging ice from a dispenser of a refrigerator door, the method comprising:

molding a case constituting an appearance of the damper assembly and having an open surface;

inserting the case in a jig and filling the case with a thermal insulating material to blow and mold the thermal insulating material; and coupling a closing plate to the case having the blown and molded insulating material therein, to cover the open surface of the case, the closing plate contacting the discharge duct when the damper assembly closes the discharge duct.

2. The method according to claim 1, wherein the thermal insulating material comprises polyurethane.

3. The method according to claim 1, wherein the thermal insulating material is blown and entirely fills an inside of the case such that the thermal insulating material is flush with the open surface of the case.

4. The method according to claim 1, wherein the closing plate comprises a thermoplastic elastomer (TPE).

5. The method according to claim 1, wherein the closing plate comprises an elastic deformable material.

6. The method according to claim 1, wherein the coupling of the closing plate comprises fixing the molded closing plate to the open surface of the case filled with the blown thermal insulating material.

7. The method according to claim 6, wherein the closing plate is fixed using an adhesive fixes to an end of the thermal insulating material and the case.

8. The method according to claim 6, wherein the closing plate is press-fit coupled in a fixing recess disposed along a front end of the case.

9. The method according to claim 1, wherein the coupling of the closing plate comprises inserting the case filled with the blown thermal insulating material into a mold to integrally form the closing plate with the case through insert injection molding.

10. The method according to claim 9, wherein the closing plate is closely fixed to both a front surface of the thermal insulating material and a front end of the case.

11. The method according to claim 9, wherein a fixing recess is recessed in a front end of the case, an insertion part is disposed on a rear surface of the closing plate to correspond to the fixing recess, and the insertion part is inserted in the fixing recess.

12. The method according to claim 9, wherein a sealing part protruding forward surrounds the closing plate.

* * * * *